April 6, 1926. Re. 16,311

B. G. BRAINE

STRESS BALANCING SPLICE BAR

Original Filed Jan. 30 1924 2 Sheets-Sheet 1

Inventor

Bancroft G. Braine,

By S. B. Wochampter.

Attorney

WITNESSES:-

Chas. L. Guggbauer

Emory L. Groff

April 6, 1926. Re. 16,311

B. G. BRAINE

STRESS BALANCING SPLICE BAR

Original Filed Jan. 30, 1924 2 Sheets-Sheet 2

Inventor

Bancroft G. Braine,

By L. P. Wochanpter.

Attorney

WITNESSES:-

Chas. L. Grieshauer

Emory R. Groff

Reissued Apr. 6, 1926.

Re. 16,311

UNITED STATES PATENT OFFICE.

BANCROFT G. BRAINE, OF MONTCLAIR, NEW JERSEY, ASSIGNOR TO THE RAIL JOINT COMPANY, OF NEW YORK, N. Y., A CORPORATION OF NEW YORK.

STRESS-BALANCING SPLICE BAR.

Original No. 1,546,883, dated July 21, 1925, Serial No. 689,526, filed January 30, 1924. Application for reissue filed February 13, 1926. Serial No. 88,136.

*To all whom it may concern:*

Be it known that I, BANCROFT G. BRAINE, a citizen of the United States, and a resident of Montclair, county of Essex, and State of New Jersey, have invented new and useful Improvements in Stress-Balancing Splice Bars, of which the following is a specification.

This invention relates to rail joint construction and more particularly to a novel distribution of metal in a splice bar for rail joints which effects economy in the use of metal while augmenting the efficiency of the bar, that is, the bar is materially strengthened as to its stress resisting capacity.

The ordinary type of splice bars are designed without reference to an economical use of metal and also without properly balancing the same above and below the horizontal neutral axis to provide a maximum factor of safety in the use of the bar. The present invention however has in view a distribution of metal in a splice bar which provides a bar in which economy of metal distribution is carefully conserved and in which there is an effective balancing of stresses at equal distances above and below the horizontal neutral axis. Accordingly, an important object of the invention is to so proportion and dispose the metal in the web and in the unsymmetrical upper and lower portions of the bar that each element of the effective section below the center line of first moment, or neutral axis, will be substantially equal to the corresponding element at an equal distance above the said center line of first moment or neutral axis, thereby not only obtaining the most economical distribution of metal, especially when considering joint bars with high fishing, but at the same time most effectively taking care of the strain produced by the applied load as well as properly taking care of the internal stresses which are the result of the strain.

Furthermore, the invention has in view an improved foot construction for the bar which lends itself to carrying out the objects above specified while at the same time having a maximum sustaining value for strains which are transferred to the outer edge of the flange of the bar.

With these and other objects in view which will be apparent to those skilled in the art the invention consists in the novel construction and combination of features hereinafter illustrated, described and claimed.

While susceptible of a structural modification without departing from the spirit or sacrificing any of the advantages of the invention certain practical embodiments thereof are shown in the accompanying drawings, in which:—

Figure 3 is a view similar to the other two figures showing the same general type of splice bar and illustrating the feature of designing an irregular or symmetrical shape so that the area of each element at corresponding distances above and below the neutral axis is the same.

Like references designate corresponding parts in the several figures of the drawings.

Figure 1:
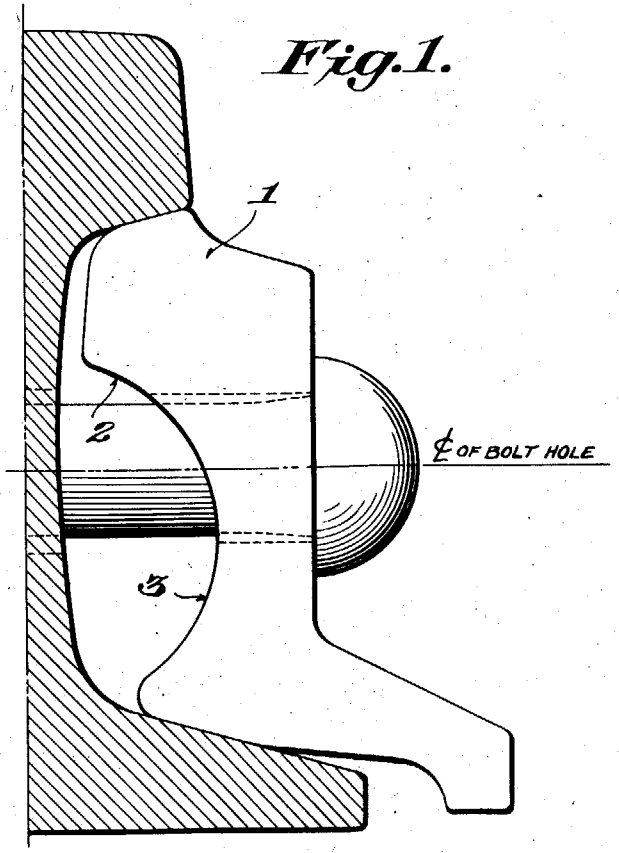
Figure 1 is an end view of a patented type of splice bar in connection with which the invention has special utility; the view also showing the bar applied to the fishing space of a rail.

As the invention possesses special utility in its application to splice bars of the well known 100% type, a typical bar of that type, for illustrative purposes, is shown in Figure 1 of the drawings, said bar representing the ideal distribution of metal according to the invention of patent of Thomson and Thomson No. 937,118, granted October 19, 1909. A distinctive feature of this type of splice bar is to correctly place an increased quantity of metal in a widened head of the bar according to the plan of metal distribution described in the said patent, thereby contributing in a practical way to an efficient balancing of the metal in the head, in the web, and in the foot flange portions of the bar. In other words, providing a better ratio, in a rigid bar, between the section modulus of the top of the bar and of the bottom of the bar. According to the plan of distribution involved in the said splice bar shown in Figure 1 of the drawings the feature is involved of carrying the metal, at the inner side of the head and at the inner side of the web of the bar down into the plane of the bolt holes, thus increasing the efficiency and strength of the head of the bar within a plane below the tops of the bolts. In connection with this inside distribution of metal an outer vertical bolting face is retained so as to provide a web member which tapers downwardly in thickness from an enlarged head 1 to a relatively thin web portion adjacent the neutral axis of the bar. Thus, an increased amount of metal is added to the inside of the head and web of the bar at a place formerly reserved for the punching of the bolt holes and the bracket of reinforcing metal thus added to the splice bar of Figure 1 of the drawings is indicated by the reference numerals 2 and 3. The reference numeral 2 indicates a downwardly and outwardly inclined inner face which intersects an upright inner face 3 between horizontal planes at the center and at the bottom of the bolt holes as shown in Figure 1 and other figures of the drawings of Patent No. 937,118 and pointed out in the specification of that patent. This particular inside configuration is shown in both Figs. 1 and 2 of the drawings.

Figure 2:
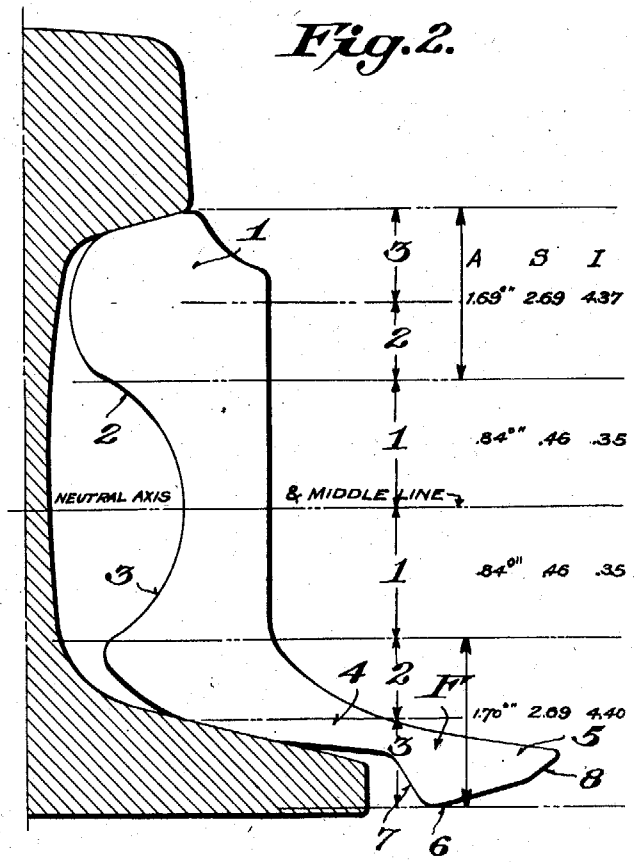
Figure 2 is a view similar to Fig. 1 showing the improved foot construction added to the said type of bar shown in Fig. 1.

The distribution of metal in the patented splice bar referred to is detailed because it may advantageously be combined with the novel distribution of metal shown in the foot flange portion F of the splice bar illustrated in Fig. 2 of the drawings. Referring more particularly to this distribution of metal in the foot flange F of the splice bar it will be seen that this foot flange is formed with a relatively thin neck portion 4 and an enlarged edge portion 5, which edge portion is of materially greater depth than the relatively thin neck portion 4. The distribution of metal adopted for the enlarged edge portion 5 of the foot flange F of the splice bar manifests itself in a shape which may be said to have substantially the form of an inverted frustum of a pyramid so that the enlarged edge portion 5 presents at its under side a truncated, or substantially truncated, apex 6, and inclining side faces 7 and 8. The side face 7 slants upwardly and inwardly to the underside of the thinned neck portion 4 and the inclined face 8 slants upward and outwardly to the outer edge of the foot flange.

The foot flange construction described when associated with an upper section having an effective distribution of metal such as shown in all four figures of the drawings provides an unsymmetrical or irregular section which may be substantially balanced element for element, therefore providing for a balancing of stresses at equal distances above and below the horizontal neutral axis, and in increments. In order to illustrate how this may effectively be done in a practical form of bar there is shown in Figure 3 of the drawings the improved splice bar construction and on which is shown, by corresponding numerals, the dividing of the bar into elements of corresponding area which are at equal distances above and below the horizontal neutral axis. Furthermore, the novel distribution of metal makes it possible to obtain a strong bar for the area and to substantially balance the bar as to area, as to strains, and as to stresses; the middle line of the section, the center line of first moment (neutral axis), and the center line of second moment all substantially coinciding. In that connection it should be mentioned that the center line of first moment is the neutral axis and had to do with the strain produced by applied load and the center line of second moment has to do with the internal stresses, the result of the strain. And, when a section can be designed so that its lines are coincident the center line of the equal areas as shown in Figure 3 will also be coincident.

In further explanation of the novel distribution of metal that makes it possible to obtain a strong bar for the area and to substantially balance the bar as to areas, as to strains and as to stresses, it will be understood that this necessarily involves a substantial balancing of the physical properties of the effective unsymmetrical parts of the bar at the top and bottom, whereby the centers of gravity and the centers of stress of the unsymmetrical top and bottom parts of the bar will be so located that the bar not only will be balanced as to area, but also statically and as to stresses. Accordingly, in laying out a splice bar shape following the principles of the present invention to obtain a balancing of stresses in the statically balanced portions, as well as to areas, the important factors to be calculated and employed are the moment of inertia, the section modulus, the static moment, as well as the area. Furthermore, it is important to the successful carrying out of the invention that the center of gravity of the head part of the bar shall be at substantially the same distance above the neutral axis or middle line as the center of gravity for the foot member of the bar is below the said axis or middle line, and that the center line of stress of the head part of the bar shall be at substantially the same distance above the neutral axis or middle line as the center line of stress for the foot part of the bar is below the said axis or middle line.

This is exemplified more clearly in Figs. 2 and 4 of the drawings wherein the zoning of the corresponding areas of metal respectively above and below the neutral axis or middle line is made on a more open and practical scale. For example, in both of said Figs. 2 and 4 of the drawings the corresponding zones of metal respectively above and below the neutral axis or middle line are shown as 1, 2 and 3, the zones 1—1 representing the areas in the substantially uniform web part of the bar which necessarily are of the same or approximately the same area, and the zones 2—2 and 3—3 representing the corresponding areas of metal in the upper and lower unsymmetrical parts of the bar. There are shown on said Figs. 2 and 4 the calculations or approximately the calculations giving the area, the static moment and the inertia for the said several zones to illustrate the substantial balancing of the physical properties thereof. Also, these calculations show that the corresponding zones, particularly for the unsymmetrical parts of the bar are not only substantially balanced as to area but also as to modulus.

Figure 4:
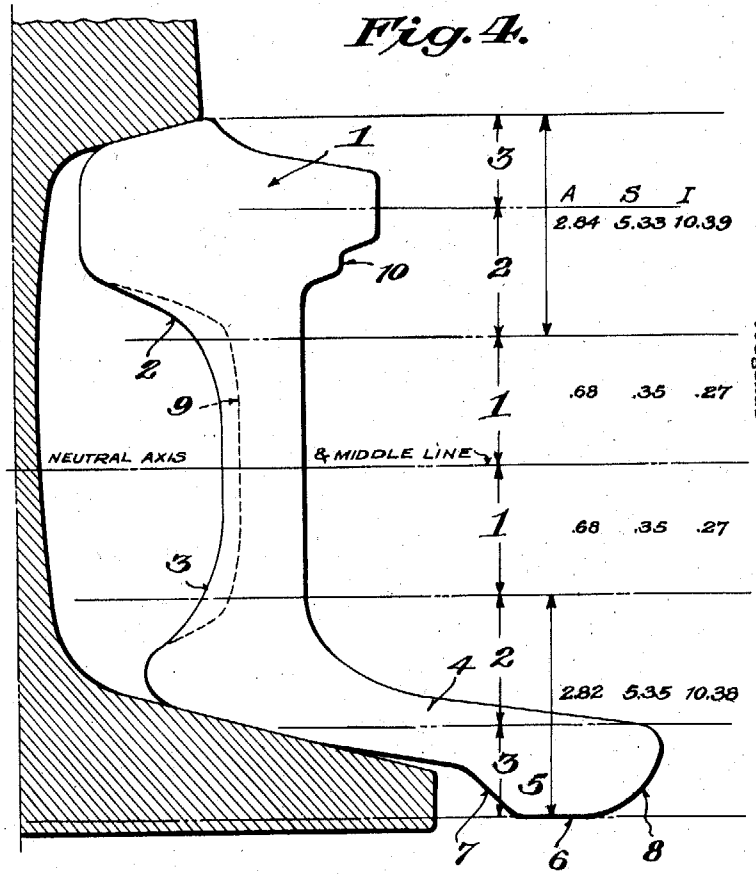
Figure 4 is an end view of a splice bar in which the invention is shown consolidated with other useful forms of metal distribution.
Figure 5:
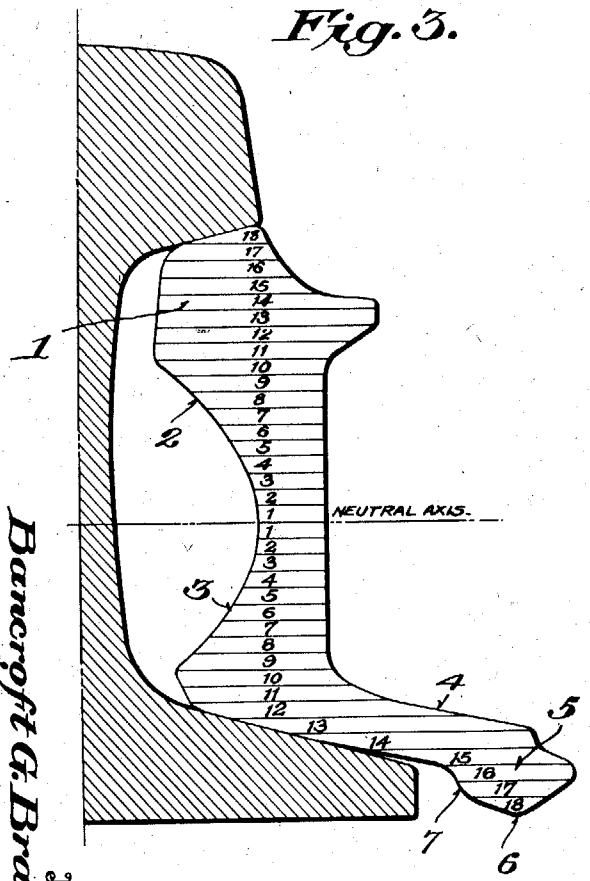

In Figure 4 of the drawings is shown an embodiment of the invention in connection with a web subnormally thinned at intervals as indicated by the dotted line 9 according to the patent of Armstrong and Groff No. 1,480,487 dated January 8, 1924 and having a stepped formation 10 at its upper outer portion according to the invention of the reissue patent of the present applicant No. Re. 15,668 dated August 7, 1923.

From the foregoing it is thought that the construction and advantages of the herein described improvement in metal distribution for splice bars will be apparent without further description, and it also will be understood that changes in the form, proportion and minor details of construction may be resorted to without departing from the invention or sacrificing any of the advantages thereof.

I claim:—

1. A splice bar having unsymmetrical upper and lower members containing effective zones of metal of substantially the same area and physical properties at equal distances respectively above and below a neutral axis or middle line.

2. A splice bar having unsymmetrical upper and lower members containing effective zones of metal of substantially the same area at equal distances respectively above and below a neutral axis.

3. A splice bar having unsymmetrical upper and lower members containing effective zones of metal of substantially the same area at equal distances respectively above and below the horizontal neutral axis.

4. A splice bar section of different section respectively above and below the horizontal neutral axis, the upper and lower unsymmetrical parts of the bar having zones of metal of the same area at equal distances from the said axis providing for a balancing of the stresses.

5. A splice bar of different section but equal modulus respectively above and below the horizontal neutral axis, the unsymmetrical parts of said bar respectively above and below said axis being of equal area.

6. A non-symmetrical splice bar having in its upper and lower unsymmetrical parts zones of metal of equal area at equal distances respectively above and below a medial line substantially bisecting the bar.

7. A splice bar of different conformation respectively above and below a line substantially bisecting the bar, said bar being of recessed formation, and having zones of metal of substantially equal areas at equal distances respectively above and below said line.

In testimony whereof I hereunto affix my signature.

BANCROFT G. BRAINE.